J. A. WHITE.
DIRECTION INDICATOR.
APPLICATION FILED FEB. 12, 1921.
1,420,353. Patented June 20, 1922.
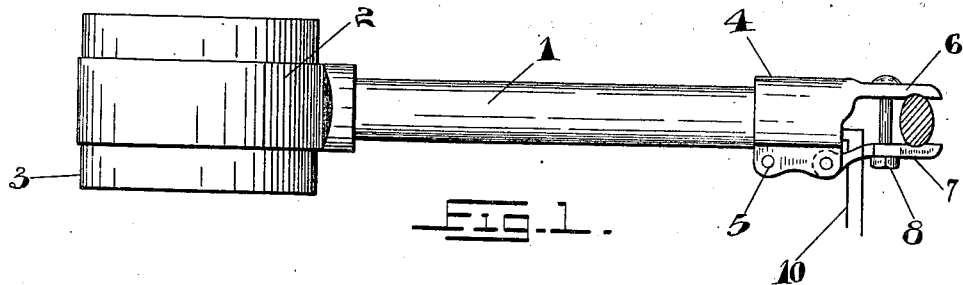
Fig. 1.
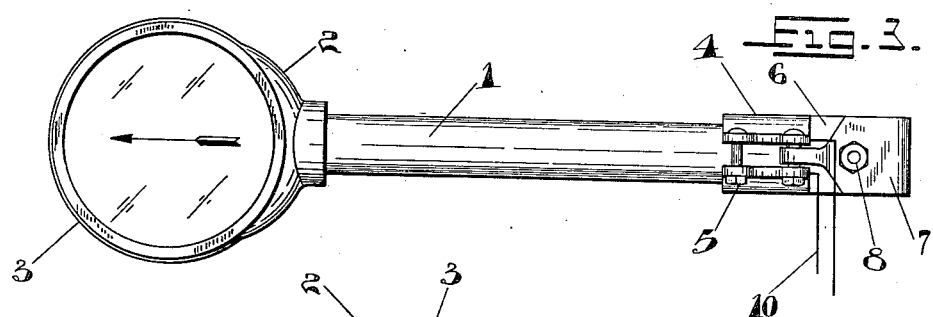
Fig. 3.
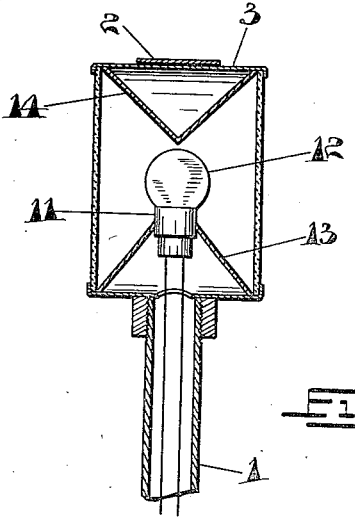
Fig. 2.
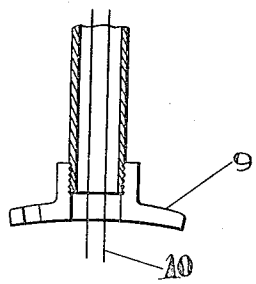
INVENTOR.
J. A. White
BY J. Edward Maybee.
ATTY.

UNITED STATES PATENT OFFICE.

JAMES ARTHUR WHITE, OF GALT, ONTARIO, CANADA.

DIRECTION INDICATOR.

1,420,353.   Specification of Letters Patent.   Patented June 20, 1922.

Application filed February 12, 1921. Serial No. 444,454.

*To all whom it may concern:*

Be it known that I, JAMES A. WHITE, of the city of Galt, in the county of Waterloo, Province of Ontario, Canada, a subject of the King of Great Britain, have invented certain new and useful Improvements in Direction Indicators, of which the following is a specification.

This invention relates to improvements in devices to be applied to automobiles and other vehicles to indicate the driver's intention to turn to the right or left or to stop, and my object is to devise simple apparatus for this purpose which may be quickly and easily applied to the vehicle and which will be simple and cheap to construct.

A further object is to provide an improved construction of the arms used for holding the indicating lights, and to so arrange the device that a single lamp in each indicator will provide ample illumination for giving an indication both forwardly and rearwardly.

I attain my objects by means of the constructions described and illustrated in the accompanying drawings in which—

Fig. 1 is a plan view of my improved indicator as adapted to be secured to a windshield frame;

Fig. 2 a longitudinal section of the indicator as arranged for connection to an automobile mud guard; and Fig. 3 a rear elevation of the indicator as arranged in Fig. 1.

In the drawings like numerals of reference indicate corresponding parts in the different figures.

1 is a tubular arm, the outer end of which is threaded into a suitable collar formed on the annular connector 2, which is brazed, soldered or otherwise secured to the side of a cylindrical casing 3, a hole being formed in the side of the casing in alinement with the opening in the annular connector. If the tubular arm is to be connected with the windshield frame it is provided with a special clamp 4. This clamp is split and embraces the end of the tube. By means of bolts 5 the clamp is tightened to grip the tubular arm.

On the split clamp is formed an integral attaching lug 6. On one of the bolts 5 is pivoted an attaching lug 7. These lugs will be suitably shaped to properly engage an upright of a windshield frame, and are clamped in engagement therewith by means of a bolt 8. In practice, the faces of the lugs will be left in an unfinished condition and will be filed by a workman to suitably fit the various types of frame used on motor cars.

As the device may also be used on the front mudguard of the car, an annular base 9 will also be provided which may be secured to the mud guard and which is provided with a socket into which the lower end of the tubular arm may be screwed.

Through the tubular arm and through the clamp or base to which the arm is connected are led the wires 10 through which electrical energy is led for the illumination of the device. The casing 3, it will be noted, is glazed at each end and a suitable direction sign will usually be painted or otherwise formed thereon. Within the casing a support is provided adapted to carry a socket 11 for an electric lamp 12. This socket, it will be noted, is in alinement with the annular connector, and is secured to a support 13. All the wiring is thus concealed and the lamp supported substantially at the center of the axis of the casing.

In order to throw the light of the single lamp towards either end and thus avoid the necessity of using two lamps to secure proper illumination, I provide reflecting means within the casing adapted to throw the light from the lamp towards either end. Preferably the support 13 is formed as a reflector sloping both ways from the center of the axis of the casing towards each end. It is also preferable to support opposite the support and reflector 13 a second reflector 14 also adapted to throw light towards each end of the casing. While many shapes might be employed for this purpose, the reflector 14 may, as shown, be formed of reflecting surfaces sloping both ways from the center of the casing, the inclination, of course, being in the opposite direction to the inclinations of the surfaces of the reflector and support 13. The signal will be used in substantially the same manner as described in my pending application No. 416969 filed Oct. 14th, 1920, the illumination of the signal indicating both towards the front and the rear the intention of the driver to stop, or turn to the right or left.

An indicator constructed as described will be seen to satisfactorily attain the objects of my invention as set out in the preamble of this specification.

What I claim as my invention is:—

Means for adjustably supporting an arm comprising a split clamp adapted to embrace the arm; a pair of bolts adapted to tighten the clamp; an attaching lug integral with the clamp and extending in a plane parallel to the axis of the clamp; an attaching lug pivoted on one of the clamp bolts; and a bolt adapted to draw the attaching lugs towards one another.

Signed at Galt this second day of February, 1921.

JAMES ARTHUR WHITE.

Witnesses:
W. F. JAMIESON,
W. B. LOWELL.